(12) United States Patent
Kumara et al.

(10) Patent No.: US 12,441,310 B2
(45) Date of Patent: Oct. 14, 2025

(54) SYSTEM AND METHOD FOR POSITIONING A VEHICLE IN A LANE

(71) Applicant: GM GLOBAL TECHNOLOGY OPERATIONS LLC, Detroit, MI (US)

(72) Inventors: Namal P. Kumara, Ypsilanti, MI (US); Tetyana V. Mamchuk, Walled Lake, MI (US); Christopher M. Churay, Farmington Hills, MI (US); Paul A. Adam, Milford, MI (US); Xuefei Yang, Northville, MI (US); Jeffrey S. Parks, Ann Arbor, MI (US); Riley Stroven, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 123 days.

(21) Appl. No.: 18/506,247

(22) Filed: Nov. 10, 2023

(65) Prior Publication Data
US 2025/0222925 A1    Jul. 10, 2025

(51) Int. Cl.
*B60W 30/12* (2020.01)
*G06V 20/56* (2022.01)

(52) U.S. Cl.
CPC .......... *B60W 30/12* (2013.01); *G06V 20/588* (2022.01); *B60W 2420/403* (2013.01); *B60W 2420/408* (2024.01); *B60W 2520/105* (2013.01); *B60W 2552/30* (2020.02); *B60W 2552/53* (2020.02); *B60W 2554/4041* (2020.02); *B60W 2554/406* (2020.02)

(58) Field of Classification Search
CPC .......... B60W 30/12; B60W 2420/403; B60W 2420/408; B60W 2520/105; B60W 2552/30; B60W 2552/53; B60W 2554/404; B60W 2554/406; G06V 20/588
USPC ..................................................... 701/41–44
See application file for complete search history.

(56) References Cited

FOREIGN PATENT DOCUMENTS

WO     WO 2023/129648 A2 *   7/2023   ............... G05D 1/04

\* cited by examiner

*Primary Examiner* — Hai H Huynh
(74) *Attorney, Agent, or Firm* — Quinn IP Law

(57) ABSTRACT

A system for controlling lateral positioning in a host vehicle. The system includes a controller adapted to identify targets surrounding a planned path with at least one distance sensor on the host vehicle and determine at least one attribute for each of the targets. The controller is also adapted to determine a lane quality along the planned path with at least one optical sensor on the host vehicle and determine a first target point and a second target point based at least one on the attributes of the targets when the lane quality has degraded below a predetermined threshold. Furthermore, the controller is adapted to calculate a follow trajectory for the host vehicle based on the first and second target points and direct the host vehicle along the follow trajectory when a lane marker identification distance is less than a minimum look ahead distance for the host vehicle.

20 Claims, 5 Drawing Sheets

SYSTEM AND METHOD FOR POSITIONING A VEHICLE IN A LANE

INTRODUCTION

The present disclosure relates generally to lane positioning of a vehicle. More particularly, the disclosure relates to a system and method of controlling lateral positioning of a host vehicle.

Automated driving systems provide assistance in driving functions using a combination of sensors, such as lidar, map data, cameras, or radar sensors. The driving function assistance may include acceleration or braking of the vehicle to maintain a specific following distance from other vehicles ahead. The driving function assistance may include a lane centering system.

SUMMARY

Disclosed herein is a system for controlling lateral positioning in a host vehicle. The system includes a controller having a processor and tangible, non-transitory memory on which instructions are recorded. The controller is adapted to identify targets surrounding a planned path of the host vehicle with at least one distance sensor on the host vehicle and determine at least one attribute for each of the targets. The controller is also adapted to determine a lane quality along the planned path with at least one optical sensor on the host vehicle and determine a first target point and a second target point based on at least one attribute for each of the targets when the lane quality has degraded below a predetermined threshold. Furthermore, the controller is adapted to calculate a follow trajectory for the host vehicle based on the first target point and the second target point and direct the host vehicle along the follow trajectory when a lane marker identification distance is less than a minimum look ahead distance for the host vehicle.

Another aspect of the disclosure may be where the at least one attribute for each of the targets includes a velocity, an acceleration, a heading (θ), or a lateral position relative to the host vehicle.

Another aspect of the disclosure may be the controller is adapted to determine at least one of a velocity, an acceleration, or a heading (θ) of the host vehicle.

Another aspect of the disclosure may be where the controller is adapted to collect vehicle lane information to determine the lane quality.

Another aspect of the disclosure may be where the lane quality includes identifying a vehicle lane marker along a roadway and determining a distance that the vehicle lane marker is visible from the host vehicle.

Another aspect of the disclosure may be where the targets surrounding the planned path of the host vehicle include a plurality of vehicles.

Another aspect of the disclosure may be where the first target point encloses a first predetermined area along the planned path and the second target point encloses a second predetermined area along the planned path with the follow trajectory at least partially intersecting the first target point and the second target point.

Another aspect of the disclosure may be where the follow trajectory extends along a path that is located within a predetermined distance of the first target point and the second target point.

Another aspect of the disclosure may be where the at least one distance sensor includes at least one of Lidar or radar.

Another aspect of the disclosure may be where the optical sensor includes a camera.

Another aspect of the disclosure may be where the first target point includes a first lateral coordinate and a first longitudinal coordinate relative to the host vehicle.

Another aspect of the disclosure may be where the second target point includes a second lateral coordinate and a second longitudinal coordinate relative to the host vehicle.

Another aspect of the disclosure may be where the second longitudinal coordinate is at least partially based on a velocity of the host vehicle and a given road of the host vehicle.

Disclosed herein is a method of operating a host vehicle. The method includes identifying targets surrounding a planned path of the host vehicle with at least one distance sensor on the host vehicle. At least one attribute is determined of each of the plurality of targets and a lane quality along the planned path is determined with at least one optical sensor on the host vehicle. A first target point and a second target point are determined based on at least one attribute for each of the targets when the lane quality has degraded below a predetermined threshold. A follow trajectory for the host vehicle is calculated based on the first target point and the second target point and the host vehicle is directed along the follow trajectory when a lane marker identification distance is less than a minimum look ahead distance for the host vehicle.

Disclosed herein is a vehicle. The vehicle includes a body defining a passenger compartment, wheels supporting the body, and sensors fixed relative to the body. A controller is in communication with the sensors. The controller is adapted to identify targets surrounding a planned path of the host vehicle with at least one distance sensor on the host vehicle and determine at least one attribute for each of the targets. The controller is also adapted to determine a lane quality along the planned path with at least one optical sensor on the host vehicle and determine a first target point and a second target point based on at least one attribute for each the targets when the lane quality has degraded below a predetermined threshold. Furthermore, the controller is adapted to calculate a follow trajectory for the host vehicle based on the first target point and the second target point and direct the host vehicle along the follow trajectory when a lane marker identification distance is less than a minimum look ahead distance for the host vehicle.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
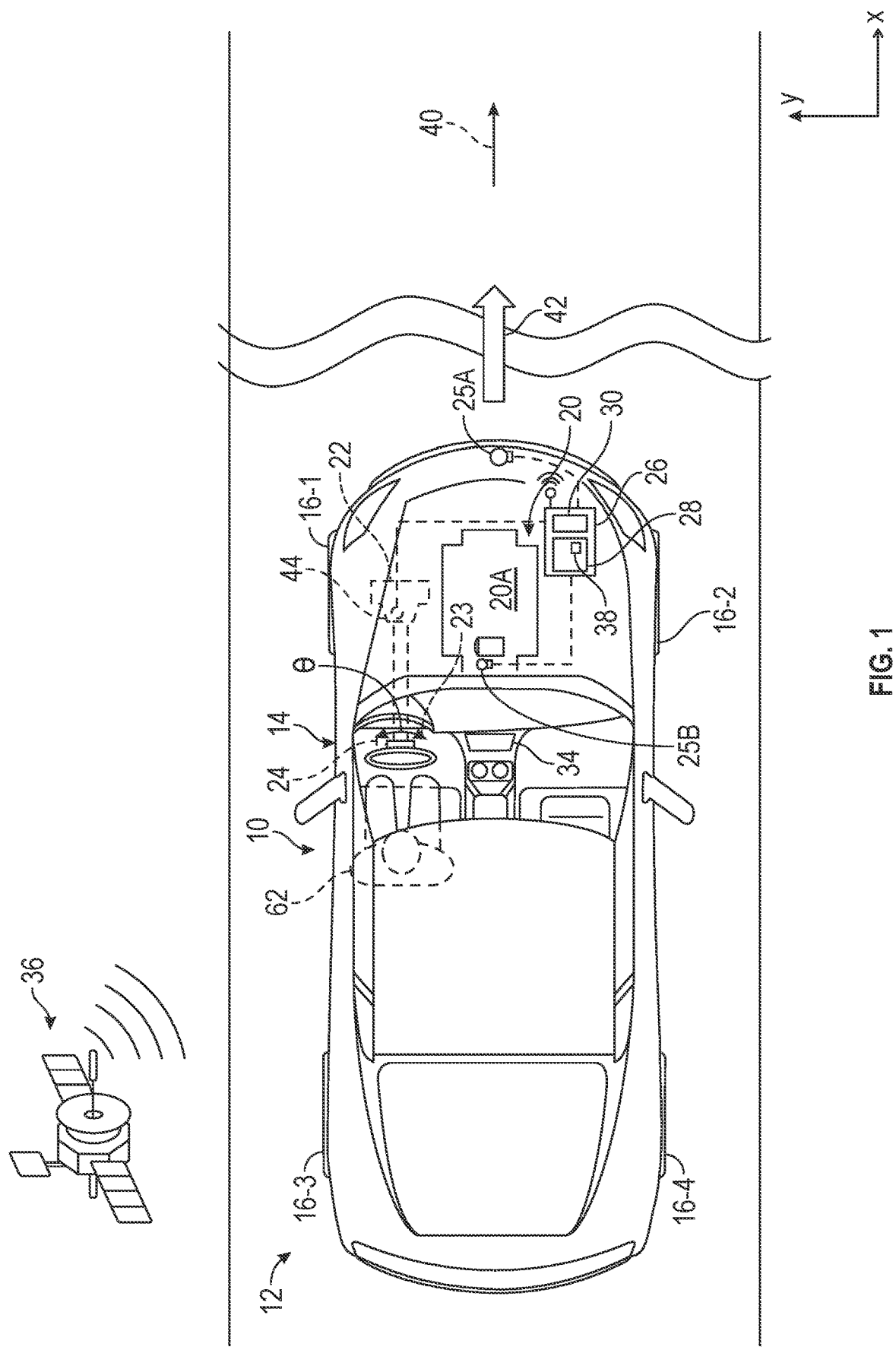
FIG. 1 schematically illustrates a host vehicle having a controller and located on a roadway.

Referring to the FIGS., wherein like numerals indicate like parts referring to the drawings, wherein like reference numbers refer to like components, FIG. 1 shows a schematic view of a motor vehicle 10 positioned relative to a road surface, such as a vehicle lane 12. As shown in FIG. 1, the vehicle 10 includes a vehicle body 14 defining a passenger compartment, a first axle having a first set of road wheels 16-1, 16-2, and a second axle having a second set of road wheels 16-3, 16-4 (such as individual left-side and right-side wheels on each axle). Each of the road wheels 16-1, 16-2, 16-3, 16-4 employs tires configured to provide fictional contact with the vehicle lane 12. Although two axles, with the respective road wheels 16-1, 16-2, 16-3, 16-4, are specifically shown, nothing precludes the motor vehicle 10 from having additional axles.

As shown in FIG. 1, a vehicle suspension system operatively connects the vehicle body 14 to the respective sets of road wheels 16-1, 16-2, 16-3, 16-4 for maintaining contact between the wheels and the vehicle lane 12, and for maintaining handling of the motor vehicle 10. The motor vehicle 10 additionally includes a drivetrain 20 having a power-source or multiple power-sources 20A, which may be an internal combustion engine (ICE), an electric motor, or a combination of such devices, configured to transmit a drive torque to the road wheels 16-1, 16-2 and/or the road wheels 16-3, 16-4. The motor vehicle 10 also employs vehicle operating or control systems, including devices such as one or more steering actuators 22 (for example, an electrical power steering unit) configured to steer the road wheels 16-1, 16-2, a steering angle (0), an accelerator device 23 for controlling power output of the power-source(s) 20A, a braking switch or device 24 for retarding rotation of the road wheels 16-1 and 16-2 (such as via individual friction brakes located at respective road wheels), etc.

As shown in FIG. 1, the motor vehicle 10 includes at least one sensor 25A and an electronic controller 26 that cooperate to at least partially control, guide, and maneuver the vehicle 10 in an autonomous mode during certain situations. As such, the vehicle 10 may be referred to as an autonomous vehicle. To enable efficient and reliable autonomous vehicle control, the electronic controller 26 may be in operative communication with the steering actuator(s) 22 configured as an electrical power steering unit, accelerator device 23, and braking device 24. The sensors 25A of the motor vehicle 10 are operable to sense the vehicle lane 12 and monitor a surrounding geographical area and traffic conditions proximate the motor vehicle 10.

The sensors 25A of the vehicle 10 may include, but are not limited to, such as at least one of a Light Detection and Ranging (LIDAR) sensor, radar, and camera located around the vehicle 10 to detect the boundary indicators, such as edge conditions, of the vehicle lane 12. The type of sensors 25A, their location on the vehicle 10, and their operation for detecting and/or sensing the boundary indicators of the vehicle lane 12 and monitor the surrounding geographical area and traffic conditions are understood by those skilled in the art, are not pertinent to the teachings of this disclosure, and are therefore not described in detail herein. The vehicle 10 may additionally include sensors 25B attached to the vehicle body and/or drivetrain 20. The sensors 25B can include similar sensors that those of the sensors 25A, such as at least one distance sensor or at least one optical sensor.

The electronic controller 26 is disposed in communication with the sensors 25A of the vehicle 10 for receiving their respective sensed data related to the detection or sensing of the vehicle lane 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 25A and 25B), etc., for managing and controlling the operation of the vehicle 10. As such, a method, described below and generally represented in FIG. 3, may be embodied as a program or algorithm partially operable on the electronic controller 26. It should be appreciated that the electronic controller 26 may include a device capable of analyzing data from the sensors 25A and 25B, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 26 includes a tangible, non-transitory memory 30 on which computer-executable instructions, including one or more algorithms, are recorded for regulating operation of the motor vehicle 10. The subject algorithm(s) may specifically include an algorithm configured to monitor localization of the motor vehicle 10 and determine the vehicle's heading relative to a mapped vehicle trajectory on a particular road course to be described in detail below.

The motor vehicle 10 also includes a vehicle navigation system 34, which may be part of integrated vehicle controls, or an add-on apparatus used to find travel direction in the vehicle. The vehicle navigation system 34 is also operatively connected to a global positioning system (GPS) 36 using an earth orbiting satellite. The vehicle navigation system 34 in connection with the GPS 36 and the above-mentioned sensors 25A may be used for automation of the vehicle 10. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. The current position of a vehicle 10 may be calculated via dead reckoning—by using a previously determined position and advancing that position based upon given or estimated speeds over elapsed time and course by way of discrete control points.

The electronic controller 26 is generally configured, i.e., programmed, to determine or identify localization 38 (current position in the X-Y plane, shown in FIG. 1), velocity, acceleration, yaw rate, as well as intended path 40, and heading 42 of the motor vehicle 10 on the vehicle lane 12. The localization 38, intended path 40, and heading 42 of the motor vehicle 10 may be determined via the navigation system 34 receiving data from the GPS 36, while velocity, acceleration (including longitudinal and lateral g's), and yaw rate may be determined from vehicle sensors 25B. Alternatively, the electronic controller 26 may use other systems or detection sources arranged remotely with respect to the vehicle 10, for example a camera, to determine localization 38 of the vehicle relative to the vehicle lane 12.

As noted above, the motor vehicle 10 may be configured to operate in an autonomous mode guided by the electronic controller 26 to transport an occupant or driver 62. In such a mode, the electronic controller 26 may further obtain data from vehicle sensors 25B to guide the vehicle along the desired path, such as via regulating the steering actuator 22. The electronic controller 26 may be additionally programmed to detect and monitor the steering angle (0) of the steering actuator(s) 22 along the desired path 40, such as during a negotiated turn. Specifically, the electronic controller 26 may be programmed to determine the steering angle (0) via receiving and processing data signals from a steering position sensor 44 (shown in FIG. 1) in communication with the steering actuator(s) 22, accelerator device 23, and braking device 24.

Figure 2:
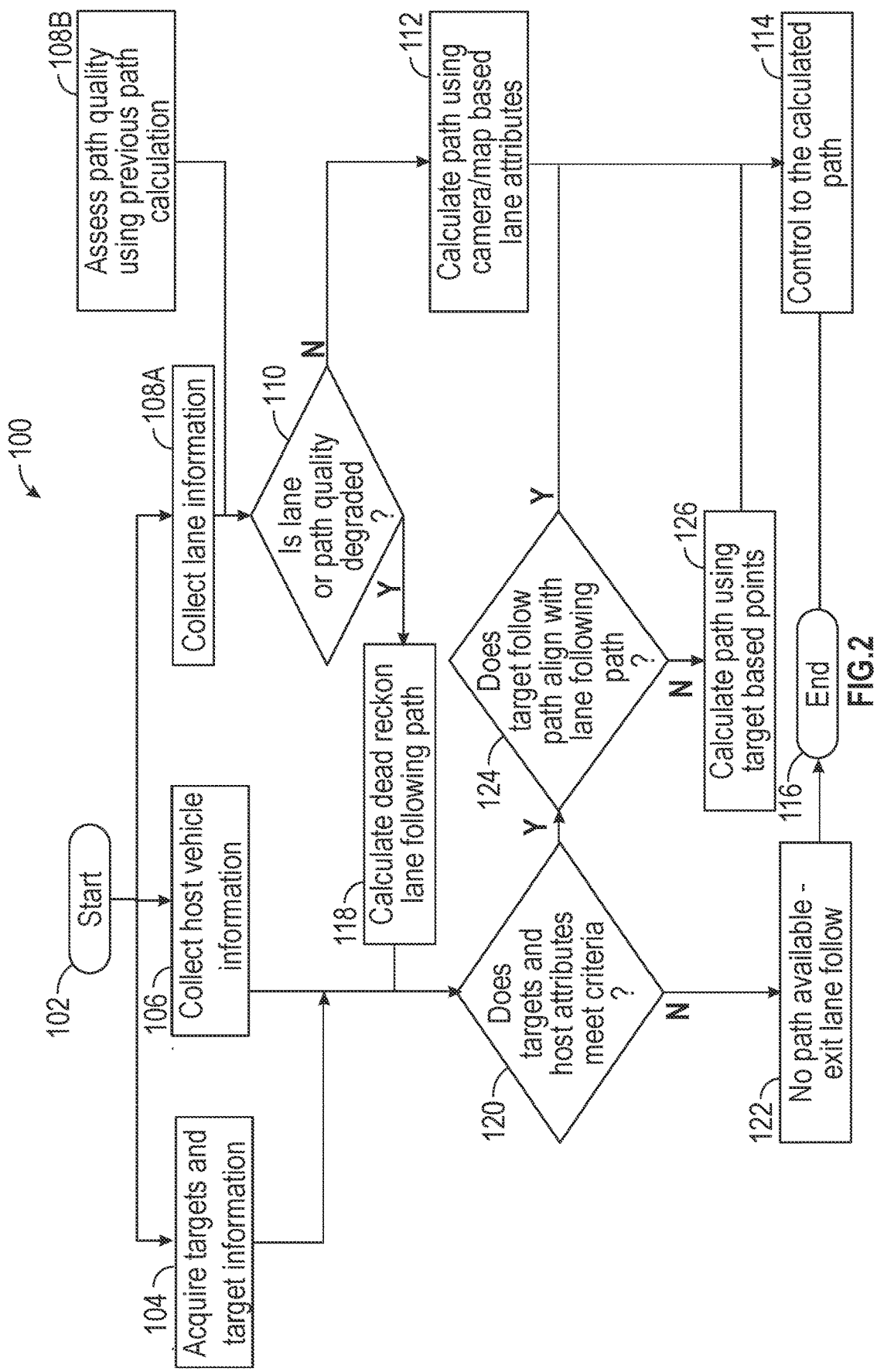
FIG. 2 is a flowchart for a method of positioning the host vehicle of FIG. 1 in a lane.

FIG. 2 illustrates an example flowchart for a method 100 of positioning the host vehicle 10 within the lane 12 on the roadway. The method 100 may be dynamically executed and need not to be applied in the specific order disclosed herein. Furthermore, it is to be understood that some steps may be eliminated.

Figure 3:
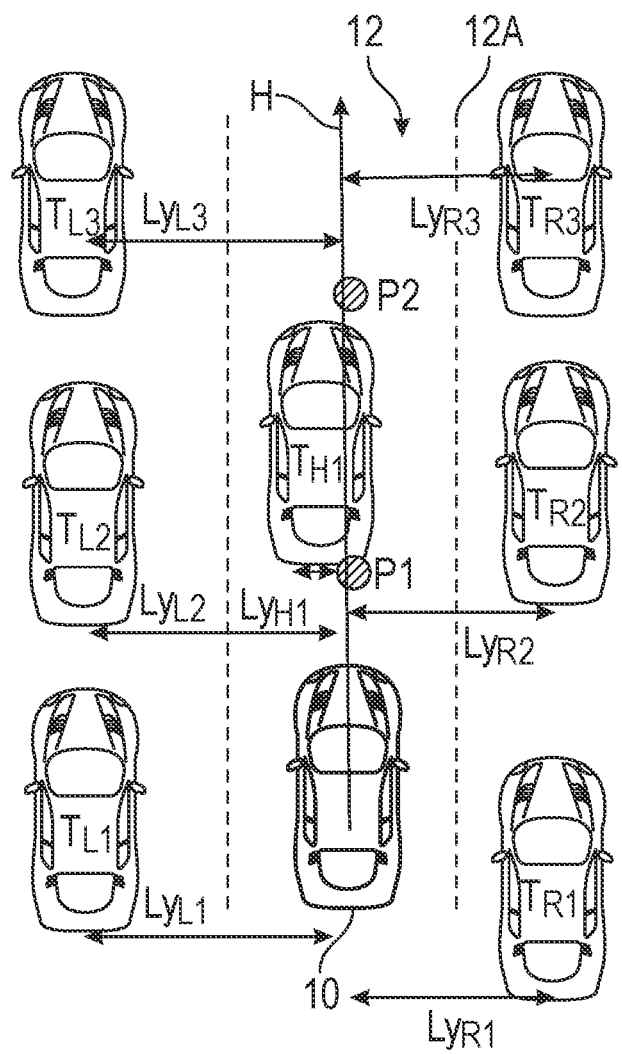
FIG. 3 is a schematic diagram of the host vehicle of FIG. 1 in a first scenario.

The method 100 begins at Block 102 with the host vehicle 10 being operated under an autonomous or semi-autonomous mode that controls at least one of velocity or heading of the host vehicle 10. The method 100 then proceeds to acquire targets and target information at Block 104, collect host vehicle information at Block 106, and collect vehicle lane information at Block 108A. At Block 104, the method 100 acquires or recognizes targets, such as other vehicles or other objects, with at least one of the sensors 25A, 25B on the host vehicle 10. FIG. 3 illustrates a scenario with multiple target vehicle T surrounding the host vehicle 10. In particular, target vehicles $T_{L1}$, $T_{L2}$, and $T_{L3}$ are located along a left side of the host vehicle 10, target $T_{H1}$ is at least partially overlapping with a heading H of the host vehicle 10, and targets $T_{R1}$, $T_{R2}$, and $T_{R3}$ are located on a right side of the host vehicle 10.

When the targets T have been acquired and recognized, the method 100 begins to determine and collect various attributes of the targets. In one example, the attributes of the target include at least one of a velocity, an acceleration, a lateral position, or a heading (θ) of the acquired target. In one example, the above attributes of the target are determined with respect to the host vehicle 10. However, at least one of the above attributes can be determined with respect to another reference frame, such as a ground truth. In the illustrated example of FIG. 3, the lateral positions of the targets $T_{L1}$, $T_{L2}$, and $T_{L3}$ are represented by distances $Ly_{L3}$, $Ly_{L2}$, and $Ly_{L3}$, the lateral position of target $T_{H1}$ is represented by distance $Ly_{H1}$, and the lateral positions of the targets $T_{R1}$, $T_{R2}$, and $T_{R3}$ are represented by distances $Ly_{R3}$, $Ly_{R2}$, and $Ly_{R1}$, respectively.

Once the targets T have been acquired and the attributes for the targets T have been determined, the method 100 will then assess the targets T for viability as reference points for lane positioning of the host vehicle 10. In particular, the method 100 will determine if the acquired attributes of the targets T are within predetermined ranges. For example, the method 100 will determine for each of the targets T if the velocity is less than a predetermined value, the acceleration is less than a predetermined value, the lateral position is within a predetermined range of distances from the heading H, and the heading is within a predetermined range.

In one example, the method 100 will acquire multiple targets T with at least one target T laterally spaced from the host vehicle 10 and at least one target T located in front of the host vehicle 10 with respect to a direction of travel, such as the heading H, of the host vehicle 10. Furthermore, the at least one laterally spaced target T can also be located at least partially in front of or behind the host vehicle 10. Similarly, the at least one target T in front of the host vehicle 10 can also be laterally spaced from the direction of travel or heading H of the host vehicle 10.

At Block 106, the method 100 collects information regarding the host vehicle 10. In one example, the information collected includes attributes or dynamics of the host vehicle 10. The dynamics of the host vehicle 10 can be measured by at least one of the sensors 25A, 25B or other on board sensors on the host vehicle 10, such as a speedometer or the vehicle navigation system 34. The attributes can include at least one of a velocity, an acceleration, or a heading (θ) of the host vehicle 10.

Once the dynamics of the host vehicle 10 are determined, the method 100 then determines if the dynamics satisfy predetermined values in order for the method 100 to proceed. For example, the method 100 may not proceed if the acceleration of the host vehicle 10 exceeds a predetermined acceleration level, the velocity of the host vehicle 10 is above a predetermined maximum velocity or below a predetermined minimum velocity, or if the heading of the host vehicle 10 exceeds a predetermined value.

At Block 108A, the method 100 collects information regarding the vehicle lane 12 that the host vehicle 10 is operating along. The information can include at least one of a speed limit, lane dimensions, lane curvature, or a distance in front of the host vehicle 10 that lane marker 12A on are visible to at least one of the sensors 25A, 25B of the host vehicle 10. The method 100 will also assess a path quality using a previous path calculation at Block 108B. The method 100 will assess the path quality by comparing two consecutive paths produced by a path algorithm with consideration of vehicle motion in the time period ($t_0$ to $t_1$) between construction of the two consecutive paths. The algorithm expects the path calculated at time $t_0$ to be confirmed as true by being within the predetermined error range of the path calculated at time t minus part of the original path which had been negated by the vehicle motion between $t_0$ and $t_1$.

The method 100 then proceeds to Block 110 to determine if the lane or path quality is degraded based on the information from Blocks 108A and 108B. The method 100 determines if the lane quality is degraded when visibility of the lane marker 12A is below a predetermined visibility threshold distance. In one example, the predetermined visibility threshold distance is determined based on the velocity of the host vehicle 10 and can change as the velocity of the host vehicle 10 changes. The lane quality can be determined based from the sensors 25A, 25B, such as when the quality of the lane markers has decreased from wear, are obstructed by another object, or are physically not visible due to environmental conditions. Block 110 also determines if the path quality is degraded below a predetermined threshold based on an assessed path quality using the previous path calculation from Block 108B discussed above.

If Block 110 determines that the lane or path have not degraded in quality below the predetermined thresholds, the method 100 proceeds to Block 112. At Block 112 the method 100 calculates a path for the host vehicle 10 using camera or map based lane attributes determined from one of the sensors 25A, 25B or the vehicle navigation system 34. The host vehicle 10 is then controlled to the calculated path at Block 114. The method 100 then proceeds to Block 116 and ends.

If the lane or path quality is determined to have degraded below the predetermined thresholds at Block 110, the method 100 proceeds to Block 118. At Block 118, the method 100 calculates a dead reckon lane following path. In one example, the dead reckon lane following path is calculated utilizing coordinates from the vehicle navigation system 34 that define the desired route of the host vehicle 10 when a predetermined destination has been programed into the vehicle navigation system 34.

The method 100 then proceeds to Block 120 to determine if the attributes of the target T and host vehicle 10 from Blocks 104 and 106, respectively, both satisfy at least one of the predetermined threshold criteria discussed above.

If the attributes of the targets T and host vehicle 10 do not satisfy the predetermined criteria, the method 100 proceeds to Block 122 as there is no path available for the host vehicle 10 such that the method 100 exits lane follow and proceed to Block 116 to end. When the host vehicle 10 exits lane follow, operation of the host vehicle 10 is handed back to the operator of the host vehicle 10.

If the attributes of the targets T and host vehicle 10 from Blocks 104 and 106 satisfy the predetermined threshold criteria as discussed above, the method 100 proceeds to Block 124. At Block 124, the method 100 determines if a path based on the targets T from Block 104 aligns with a path determined from information regarding the vehicle lane from Block 108A, such as a path determined from camera and map based lane attributes. The method 100 determines a follow trajectory from the targets based on calculating a first target point $P_1$ and a second target point $P_2$.

In one example, the first and second target points $P_1$ and $P_2$ can each be placed in first and second predetermined areas, respectively, relative to the target $T_{h1}$ position as assessed by sensors 25A,25B. The first and second predetermined areas can be equal in size or the first and second predetermined areas can be unequal in size. The following trajectory can then at least partially intersect each of the first and second target points $P_1$ and $P_2$.

In another example, the first and second target points $P_1$ and $P_2$ each include a single point along the planned path. The follow trajectory can then extend along a path that is within a predetermined distance of the points or intersects the points.

In one example, the coordinates of the first and second target points $P_1$ and $P_2$ are determined based on a cartesian coordinate system taken relative to the host vehicle 10. Accordingly, the first and second target points $P_1$ and $P_2$ each include x and y coordinates that are calculated. The x coordinate for the first target point $P_1$ is calculated by EQ. 1 below and the x coordinate for the second target point $P_2$ is calculated by EQ. 2 below.

$$P1_x = T_{h1_x} \qquad \text{EQ. 1}$$

$$P2_x \sim f(V_h, k_{map}) \qquad \text{EQ. 2}$$

In EQ. 2 above, $V_h$ is the velocity of the host vehicle 10 and $k_{map}$ is a given road curvature that the host vehicle 10 is traveling along. In one example, the given road curvature is determined based on at least one of GPS data from the vehicle navigation system 34 or lane information from Block 108A. To smooth out measurement fluctuations, an example point estimation is used for determining a target lateral, such as shown in EQ. 3 below.

$$\sigma_y^2 = \frac{\sum(Y_i - \bar{Y})^2}{n-1} = \frac{\sum Y_i^2 - (\sum Y_i)^2 / n}{n-1} \qquad \text{EQ. 3}$$

In EQ. 3 above, n observations of Y are collected over a period of time t with Y population being maintained through a first in first out ("FIFO") buffer.

Corresponding y coordinates for the first target point $P_1$ and the second target point $P_2$ are provided with EQS. 4 and 5 below, respectively.

$$P1_Y = \frac{\left(K_L\left(\frac{\sum Ly_L\{Lx < Kx\}}{N_L} + W\right) + K_H\left(\frac{\sum Ly_H\{Lx < Kx\}}{N_H}\right) + K_R\left(\frac{\sum Ly_R\{Lx < Kx\}}{N_R} - W\right)\right)}{K_L + K_H + K_R} \qquad \text{EQ. 4}$$

$$P2_Y = \frac{\left(K_L\left(\frac{\sum Ly_L\{Lx > Kx\}}{N_L} + W\right) + K_H\left(\frac{\sum Ly_H\{Lx > Kx\}}{N_H}\right) + K_R\left(\frac{\sum Ly_R\{Lx > Kx\}}{N_R} - W\right)\right)}{K_L + K_H + K_R} \qquad \text{EQ. 5}$$

In EQS. 4 and 5 above, K is a calibration look up, L is a relative lateral position, W is a width of a lane, and N is a number of targets in lane X.

The heading or follow trajectory based on the first and second target points $P_1$ and $P_2$ is calculated from the below equations.

$$y(P_1) = C_o + C_1 * x(P_1) + C_2 * x(P_1)^2 \qquad \text{EQ. 6}$$

$$\dot{y} = C_1 + 2 * C_2 * x(P_1) = \frac{y(P_2) - y(P_1)}{x(P_2) - x(P_1)} \qquad \text{EQ. 7}$$

EQS. 6 and 7 above can then be solved for a third order polynomial trajectory (e.g., the follow trajectory) with the below EQS. 8-10 with k being a map provided curvature at look point LP (FIG. 4) that can be either path merge point, $P_1$, or f (time, velocity)

$$C_2 = \frac{k}{2} \qquad \text{EQ. 8}$$

$$C_1 = y' - k*x \qquad \text{EQ. 9}$$

$$C_0 = y - C_1*x - C_2*x^2 \qquad \text{EQ. 10}$$

Figure 4:
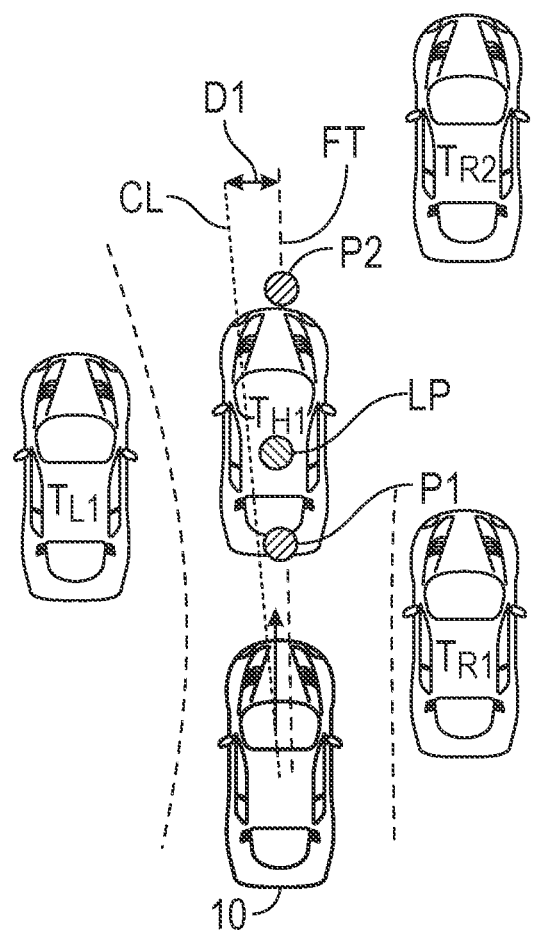
FIG. 4 is a schematic diagram of the host vehicle of FIG. 1 in a second scenario.

Once the follow trajectory is calculated as discussed above, the method 100 can determine if the path determined above aligns with a path determined from information regarding the vehicle lane from Block 108A. As shown in FIG. 4, the method determines if a camera lane center CL is within a predetermined distance D1 of the follow trajectory FT as calculated above. If the distance D1 is less than a maximum distance or within a predetermined distance, the method 100 proceeds to Block 114 and controls the host vehicle 10 along the lane follow path as determined from the camera or map based lane attributes. The method 100 then proceeds to Block 116 and ends.

Figure 5:
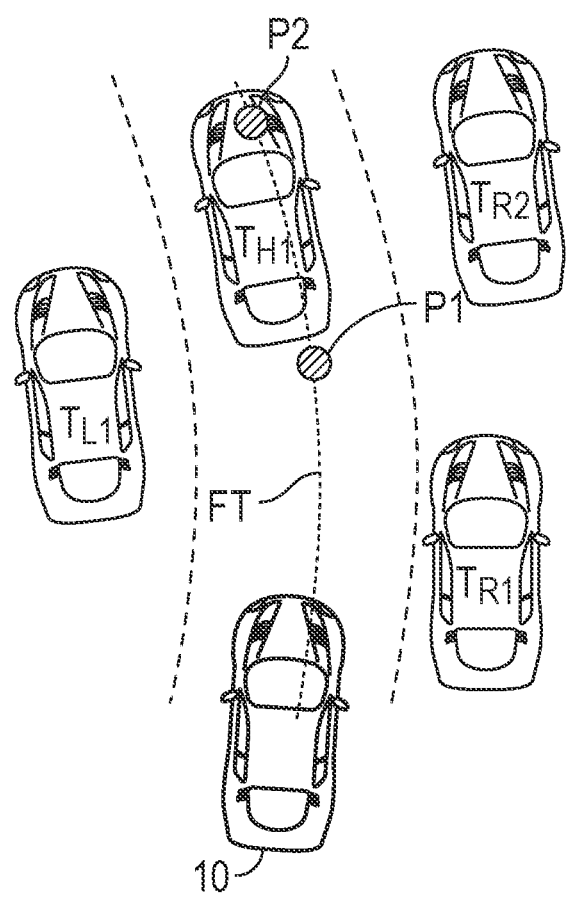
FIG. 5 is a schematic diagram of the host vehicle of FIG. 1 operating along a follow trajectory having a curvature.

If the target follow path does not align with the lane follow path, the method 100 proceeds to Block 126. At Block 126 the method 100 selects the follow trajectory over the lane follow path and then proceeds to Block 114 to control the host vehicle 10 along the follow trajectory FT using the first and second target points $P_1$ and $P_2$ As shown in FIG. 5. The method 100 then proceeds to Block 116 and ends.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

While the best modes for carrying out the disclosure have been described in detail, those familiar with the art to which this disclosure relates will recognize various alternative designs and embodiments for practicing the disclosure within the scope of the appended claims.

Any of the dimensions, configurations, etc. discussed herein may be varied as needed or desired to be different than any value or characteristic specifically mentioned herein or shown in the drawings for any of the embodiments.

It will be apparent to those skilled in the art that various modifications and variations can be made to the embodiments of the apparatus and methods of assembly as discussed herein without departing from the scope or spirit of the disclosure(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments to provide still further embodiments.

What is claimed is:

1. A system for controlling lateral positioning in a host vehicle, the system comprising:
 a controller having a processor and tangible, non-transitory memory on which instructions are recorded, the controller being adapted to:
  identify a plurality of targets surrounding a planned path of the host vehicle with at least one distance sensor on the host vehicle;
  determine at least one attribute for each of the plurality of targets;
  determine a lane quality along the planned path with at least one optical sensor on the host vehicle;
  determine a first target point and a second target point based on the at least one attribute for each of the plurality of targets when the lane quality has degraded below a predetermined threshold;
  calculate a follow trajectory for the host vehicle based on the first target point and the second target point; and
  direct the host vehicle along the follow trajectory when a lane marker identification distance is less than a minimum look ahead distance for the host vehicle.

2. The system of claim 1, wherein the at least one attribute for each of the plurality of targets includes a velocity, an acceleration, a heading ($\theta$), or a lateral position relative to the host vehicle.

3. The system of claim 2, wherein the controller is adapted to determine at least one of a velocity, an acceleration, or a heading ($\theta$) of the host vehicle.

4. The system of claim 1, wherein the controller is adapted to collect vehicle lane information to determine the lane quality.

5. The system of claim 4, wherein the lane quality includes identifying a vehicle lane marker along a roadway and determining a maximum distance that the vehicle lane marker is visible from the host vehicle and the predetermined threshold is based on the maximum distance that the vehicle lane marker is visible from the host vehicle.

6. The system of claim 1, wherein the plurality of targets surrounding the planned path of the host vehicle include a plurality of vehicles.

7. The system of claim 1, wherein the first target point encloses a first predetermined area along the planned path and the second target point encloses a second predetermined area along the planned path with the follow trajectory at least partially intersecting the first target point and the second target point.

8. The system of claim 1, wherein the follow trajectory extends along a path that is located within a predetermined distance of the first target point and the second target point.

9. The system of claim 1, wherein the at least one distance sensor includes at least one of Lidar or radar.

10. The system of claim 1, wherein the optical sensor includes a camera.

11. The system of claim 1, wherein the first target point includes a first lateral coordinate and a first longitudinal coordinate relative to the host vehicle.

12. The system of claim 11, wherein the second target point includes a second lateral coordinate and a second longitudinal coordinate relative to the host vehicle.

13. The system of claim 12, wherein the second longitudinal coordinate is at least partially based on a velocity of the host vehicle and a given road curvature of the host vehicle.

14. A method of operating a host vehicle, the method comprising:
identifying a plurality of targets surrounding a planned path of the host vehicle with at least one distance sensor on the host vehicle;
determining at least one attribute of each of the plurality of targets;
determining a lane quality along the planned path with at least one optical sensor on the host vehicle;
determining a first target point and a second target point based on the at least one attribute for each of the plurality of targets when the lane quality has degraded below a predetermined threshold;
calculating a follow trajectory for the host vehicle based on the first target point and the second target point; and
directing the host vehicle along the follow trajectory when a lane marker identification distance is less than a minimum look ahead distance for the host vehicle.

15. The method of claim 14, wherein determining the at least one attribute for each of the plurality of targets includes determining at least one of a velocity, an acceleration, a heading ($\theta$), or a lateral position relative to the host vehicle.

16. The method of claim 15, including determining at least one of a velocity, an acceleration, or a heading ($\theta$) of the host vehicle.

17. The method of claim 14, wherein determining the lane quality includes identifying a vehicle lane marker along a roadway and determining a maximum distance that the vehicle lane marker is visible from the host vehicle and the predetermined threshold is based on the maximum distance that the vehicle lane marker is visible from the host vehicle.

18. The method of claim 14, wherein the first target point includes a first lateral coordinate and a first longitudinal coordinate relative to the host vehicle, the second target point includes a second lateral coordinate and a second longitudinal coordinate relative to the host vehicle, and the second longitudinal coordinate is at least partially based on a velocity of the host vehicle and a given road curvature of the host vehicle.

19. A host vehicle comprising:
a body defining a passenger compartment;
a plurality of wheels supporting the body;
a plurality of sensors fixed relative to the body; and
a controller in communication with the plurality of sensors and configured to:
identify a plurality of targets surrounding a planned path of the host vehicle with at least one distance sensor on the host vehicle;
determine at least one attribute of each of the plurality of targets;
determine a lane quality along the planned path with at least one optical sensor on the host vehicle;
determine a first target point and a second target point based on the at least one attribute for each of the plurality of targets when the lane quality has degraded below a predetermined threshold;
calculate a follow trajectory for the host vehicle based on the first target point and the second target point; and
direct the host vehicle along the follow trajectory when a lane marker identification distance is less than a minimum look ahead distance for the host vehicle.

20. The host vehicle of claim 19, wherein the at least one attribute for each of the plurality of targets includes determining at least one of a velocity, an acceleration, a heading ($\theta$), or a lateral position relative to the host vehicle.

* * * * *